(12) United States Patent
Celik et al.

(10) Patent No.: US 11,032,464 B2
(45) Date of Patent: Jun. 8, 2021

(54) METHODS AND APPARATUS FOR ABSOLUTE AND RELATIVE DEPTH MEASUREMENTS USING CAMERA FOCUS DISTANCE

(71) Applicant: Applied Materials, Inc., Santa Clara, CA (US)

(72) Inventors: Ozkan Celik, Cedar Park, TX (US); Patricia A. Schulze, Giddings, TX (US); Gregory J. Freeman, Austin, TX (US); Paul Z. Wirth, Kalispell, MT (US); Tommaso Vercesi, Aschaffenburg (DE)

(73) Assignee: Applied Materials, Inc., Santa Clara, CA (US)

( * ) Notice: Subject to any disclaimer, the term of this patent is extended or adjusted under 35 U.S.C. 154(b) by 29 days.

(21) Appl. No.: 16/669,197

(22) Filed: Oct. 30, 2019

(65) Prior Publication Data

US 2020/0068119 A1    Feb. 27, 2020

Related U.S. Application Data

(63) Continuation of application No. 16/000,884, filed on Jun. 5, 2018, now Pat. No. 10,498,948.

(51) Int. Cl.
*H04N 5/232* (2006.01)
*G06T 7/571* (2017.01)
(Continued)

(52) U.S. Cl.
CPC ....... *H04N 5/23212* (2013.01); *G01B 11/002* (2013.01); *G06T 7/571* (2017.01); *H04N 2013/0081* (2013.01)

(58) Field of Classification Search
CPC ....... H04N 5/23212; H04N 2013/0081; G01B 11/002; G06T 7/571
See application file for complete search history.

(56) References Cited

U.S. PATENT DOCUMENTS

| 4,641,942 A | 2/1987 | Sakai et al. |
| 6,021,209 A | 2/2000 | Hirabayashi et al. |

(Continued)

FOREIGN PATENT DOCUMENTS

| JP | 06-147845 A | 5/1994 |
| JP | 10-103934 A | 4/1998 |

(Continued)

OTHER PUBLICATIONS

International Search Report and Written Opinion dated Sep. 26, 2019, on Application No. PCT/US2019/035446.

*Primary Examiner* — Hung H Lam
(74) *Attorney, Agent, or Firm* — Lowenstein Sandler LLP

(57) ABSTRACT

A depth measuring apparatus includes a camera assembly, a position sensor, and a controller. The camera assembly is configured to capture a plurality of images of a target at a plurality of distances from the target. The position sensor is configured to capture, for each of the plurality of images, corresponding position data associated with a relative distance between the camera assembly and the target. The controller is configured to, for each of a plurality of regions within the plurality of images: determine corresponding gradient values within the plurality of images; determine a corresponding maximum gradient value from the corresponding gradient values; and determine a depth measurement for the region based on the corresponding maximum gradient and the corresponding position data captured for an image from the plurality of images that includes the corresponding maximum gradient.

20 Claims, 7 Drawing Sheets

(51) Int. Cl.
*G01B 11/00* (2006.01)
*H04N 13/00* (2018.01)

(56) References Cited

U.S. PATENT DOCUMENTS

| | | | |
|---|---|---|---|
| 7,262,798 | B2 | 8/2007 | Stavely et al. |
| 7,538,813 | B2 | 5/2009 | Wernersson |
| 8,184,196 | B2 | 5/2012 | Forutanpour |
| 8,190,014 | B2 * | 5/2012 | Tsuda ............... H04N 5/232127 |
| | | | 396/133 |
| 8,218,061 | B2 | 7/2012 | Baxansky |
| 8,405,742 | B2 | 3/2013 | Lim |
| 8,724,013 | B2 | 5/2014 | Safaee-Rad et al. |
| 9,473,695 | B2 | 10/2016 | Shchepetov et al. |
| 9,554,031 | B2 | 1/2017 | Laroia et al. |
| 9,704,250 | B1 | 7/2017 | Shah et al. |
| 10,019,810 | B2 | 7/2018 | Amison et al. |
| 2008/0137912 | A1 | 6/2008 | Kim et al. |
| 2009/0073305 | A1 | 3/2009 | Yuba et al. |
| 2010/0033617 | A1 * | 2/2010 | Forutanpour ........... G06T 7/564 |
| | | | 348/345 |
| 2010/0254596 | A1 | 10/2010 | Xiong et al. |
| 2012/0051631 | A1 * | 3/2012 | Nguyen ............. G06K 9/00201 |
| | | | 382/164 |
| 2013/0194255 | A1 * | 8/2013 | Lee ....................... H04N 19/597 |
| | | | 345/419 |
| 2014/0132791 | A1 | 5/2014 | Tzur |
| 2014/0132822 | A1 | 5/2014 | Miyagi et al. |
| 2015/0254811 | A1 * | 9/2015 | Sahu ........................ G06T 5/50 |
| | | | 382/154 |
| 2016/0301852 | A1 | 10/2016 | Krishnamurthy Sagar et al. |
| 2017/0024920 | A1 * | 1/2017 | Zhang ...................... G06T 7/20 |
| 2018/0144179 | A1 * | 5/2018 | Hatakeyama ........ G06K 9/0061 |
| 2018/0372484 | A1 | 12/2018 | Fujita et al. |
| 2019/0094981 | A1 * | 3/2019 | Bradski ................... G06F 3/011 |
| 2019/0113606 | A1 * | 4/2019 | Mathy ................. H04N 13/254 |

FOREIGN PATENT DOCUMENTS

| | | |
|---|---|---|
| JP | 2008-039427 A | 2/2008 |
| JP | 2010-152026 A | 7/2010 |
| WO | 2017/163537 A1 | 9/2017 |
| WO | 2017/197085 A1 | 11/2017 |

* cited by examiner

METHODS AND APPARATUS FOR ABSOLUTE AND RELATIVE DEPTH MEASUREMENTS USING CAMERA FOCUS DISTANCE

RELATED APPLICATION

This application is a continuation application of U.S. patent application Ser. No. 16/000,884, filed on Jun. 5, 2018, the entire content of which is hereby incorporated by reference herein.

FIELD

Embodiments provided herein relate to depth measurements, and more specifically to methods and apparatus for absolute and relative depth measurements using camera focus distance.

BACKGROUND

Cameras are commonly employed for position measurements in applications where high accuracy positioning in a two-dimensional image plane (x and y planes) is necessary. These applications include, for example, alignment of a mask and substrate in preparation for patterning processes in the production of ultra-high definition displays and high pixel density screens for mobile devices.

Currently, in these types of applications, distance measurements along a depth axis (z plane) are typically performed using laser distance sensors, confocal sensors or contact sensors. These sensors may add substantial cost and complexity to current manufacturing processes.

Accordingly, depth measurement apparatus and methods with high accuracy and without the complexity and costs involved with the use of existing sensors are desired.

SUMMARY

In some embodiments, a depth measuring apparatus is provided that includes (1) a camera and lens assembly capable of capturing image data for a sequence of images of a target containing a plurality of depth levels along a camera axis; (2) a motion stage on which the camera and lens assembly or target is positioned; (3) a motor connected to the motion stage that provides for relative movement between the camera and lens assembly and the target along the camera axis at defined incremental values; (4) a position sensor capable of capturing relative position data of the camera and lens assembly or the target along the camera axis at each incremental value of movement; and (5) a controller. The controller includes (a) an image processing unit configured to use an image gradient method to generate image sharpness data for the plurality of depth levels represented as regions of interest within the captured image data; (b) a distance processing unit configured to use the image sharpness data to determine an optimal focus distance between the camera and lens assembly and each of the plurality of depth levels represented as regions of interest within the captured image data; and (c) a depth processing unit configured to process the optimal focus distance data to determine a depth for each of the plurality of the depth levels represented as regions of interest within the captured image data.

A depth measuring apparatus is provided that includes (1) a camera and lens assembly capable of capturing image data for a sequence of images of a target including a plurality of depth levels along a camera axis; (2) a motion stage on which the camera and lens assembly or the target is positioned; (3) a motor connected to the motion stage and configured to cause relative movement between the camera and lens assembly and the target along the camera axis at defined incremental values; (4) a position sensor capable of capturing position data on the camera and lens assembly or the target along the camera axis at each of the defined incremental values; and (5) a controller configured to process the captured image data and captured position data using an image gradient method and optimal focal distance to determine a depth for each of the plurality of depth levels.

In some embodiments, a method of measuring depth is provided that includes (1) providing a target having a plurality of depth levels; (2) positioning a camera and lens assembly or the target on a motion stage such that the camera and lens assembly or the target is moveable; (3) stepping the camera and lens assembly or the target at defined incremental values through an optimal focus distance for all of the plurality of the depth levels of the target; (4) at each incremental value, employing a position sensor to measure position data of the camera and lens assembly or the target; (5) at each incremental value, employing the camera and lens assembly to capture an image of the target so as to capture a sequence of images; (6) applying an image gradient method to each of the images within the captured sequence of images, the image gradient method creating processed images with higher intensity gradient values where a greater amount of sharpness detail is visible at edges of a depth level and lower intensity gradient values where a lesser amount of sharpness detail is visible at edges of a depth level in each of the captured images; (7) determining regions of interest within the processed images for each of the plurality of depth levels; (8) creating an image sharpness scalar value for each processed image and for each region of interest; (9) determining an optimal focus distance for each region of interest based on the image sharpness scalar values for each region of interest; and (10) determining a depth measurement for each of the plurality of depth levels based on the determined optimal focus distance for each of the regions of interest.

Numerous other aspects are provided in accordance with these and other embodiments of the disclosure. Other features and aspects of embodiments of the present disclosure will become more fully apparent from the following detailed description, the accompanying drawings, and the claims.

BRIEF DESCRIPTION OF THE DRAWINGS

The drawings, described below, are for illustrative purposes only and are not necessarily drawn to scale. The drawings are not intended to limit the scope of the disclosure in any way.

DETAILED DESCRIPTION

Figure 1A:
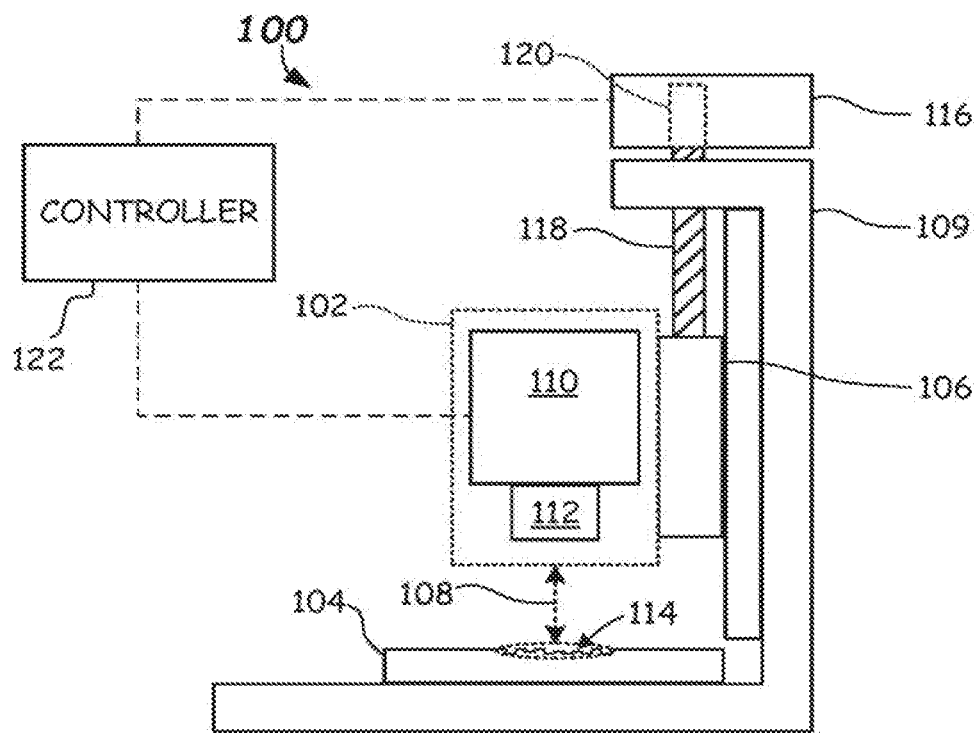
FIG. 1A illustrates a perspective view of a depth measurement apparatus using camera focus distance in accordance with embodiments provided herein.

Reference will now be made in detail to the example embodiments, which are illustrated in the accompanying drawings. Wherever possible, the same reference numbers will be used throughout the drawings to refer to the same or like parts throughout the several views. Features of the various embodiments described herein may be combined with each other, unless specifically noted otherwise.

Existing high accuracy measurement systems for flat panel display and/or semiconductor device manufacturing require separate sensors for each region of a substrate to be measured. These sensors may include laser-based and confocal sensors, or contact sensors which come into actual contact with each individual region to be measured. As a result, these types of sensors add substantial cost and complexity to manufacturing processes.

To ameliorate one or more of the problems listed above, and in particular the cost and complexity of laser-based, confocal or contact-based sensors, depth measuring apparatus and methods are provided which are less expensive and do not require direct contact with one or more regions to be measured.

In some embodiments provided herein, imaging camera and focus distance may be employed to obtain precise surface depth measurements. For example, a camera assembly including a camera and lens may be moved along an axis toward an object on which one or more features at different depth levels are to be measured (e.g., a target). A "step and capture image" process may be performed in which the camera records a sequence of images at predefined intervals as the camera assembly moves toward or away from the target. In alternative embodiments, the target or both the target and the camera assembly may be moved relative to one another. At each predefined interval or step of the camera assembly (and/or target), an image is captured and the position of the camera assembly (and/or the target) is determined.

As the distance between the camera assembly and target changes, surface regions at different depths on the target come in and out of focus. An image sharpness metric, based on an image gradient filter, for example, may be applied to each captured image to determine at which step (distance) a particular depth level on the target is in optimal (or maximum) focus. For example, in some embodiments, a gradient-based detection method such as application of an edge detection filter (e.g., a Sobel filter) may be applied to each captured image. Such a gradient-based detection method may produce higher gradient values where distinct or more focused edges are detected, and lower gradient values where out-of-focus or no edges are detected. Each filtered image may be partitioned into regions of interest, with a different region of interest corresponding to each depth level on the target to be measured. For example, each region of interest may be a subset of pixels within the captured and filtered image.

In some embodiments, an aggregation function may be applied to each region of interest. For example, the gradient values determined for each pixel (or a subset of pixels) within a region of interest may be employed to calculate a mean gradient value, a standard deviation, a maximum or median gradient value, a combination of the above such as standard deviation divided by mean, or the like. Such aggregated values are also referred to herein as image sharpness scalars.

Image sharpness for a particular region of interest, may be analyzed versus position of the camera assembly (or target). The distance at which image sharpness is maximal or optimal for a region of interest provides a measure of the relative depth for that region of interest (and thus the corresponding depth level on the target). Image sharpness versus distance may be analyzed for each region of interest to obtain a measure of relative depth for each depth level to be measured on the target. In some embodiments, to improve resolution and/or accuracy, a function may be fit to the image sharpness versus distance data for each region of interest, and a maxima of the function may be used to identify the position of maximum focus. Example functions include Gaussian functions, Cauchy functions, etc.

Note that as used herein "maximum" or "optimal" focus refers to a maximum or optimal focus as measured (or predicted by a function), and may not represent the actual maximum or optimal focus for an image. For example, the camera assembly (or target) may not stop and record an image at the exact distance which provides the optimal focus for a particular depth level. Therefore, as used herein, maximum or optimal focus refers to the maximum or optimal measured and/or predicted focus.

Depth measurements between depth levels (e.g., surfaces) on the target represent a relative depth measurement between the depth levels. In some embodiments, a reference feature having a known depth measurement may be located near or on the target or the camera assembly and may be used to establish an absolute depth measurement for each depth level of the target being measured.

Further details of example depth measuring apparatuses and methods provided herein are described with reference to FIGS. 1A-7 below.

FIG. 1A illustrates a perspective view schematic of a depth measurement apparatus 100 using camera focus distance in accordance with embodiments provided herein. The depth measurement apparatus 100 may include a camera and lens assembly 102 (shown as a dotted line in FIG. 1A) and a target 104. The camera and lens assembly 102 is mounted on a motion stage 106 in a manner that provides for relative movement between the camera and lens assembly 102 and the target 104 along a camera axis 108. A frame 109 is shown that supports camera and lens assembly 102, target 104 and motion stage 106. Any suitable frame or other structure may be used to support these components (e.g., one or more frame or other support members).

The camera and lens assembly 102 includes an image capturing element 110 and a lens assembly 112. The image capturing element 110 may be comprised of any type of image capturing device known to one of ordinary skill in the art. In one or more embodiments, the image capturing element 110 may be a complementary metal-oxide-semiconductor (CMOS) or a charged coupled device (CCD) of a suitable resolution. Example resolutions may be 2-12 megapixels or higher, and in some embodiments, about 4-6 megapixels or higher. One particular example CMOS sensor that may be employed may have approximately 2000×2000 pixels, about 5 megapixel resolution and a pixel size of about 3.5 micrometers. Other sensor types, pixel sizes, numbers of pixels and/or resolutions may be used. The resolution of the image capturing element 110 may depend on a number of parameters such as the size of the features to be imaged, lighting, pixel size, sensor size, the type of lens(es) used in camera and lens assembly 102, etc. In some embodiments, camera and lens assembly 102 may image a region on target 104 of about 1 mm×1 mm. Other region sizes may be imaged.

The lens assembly 112 is positioned in functional communication with the image capturing element 110. Specifically, the lens assembly 112 focuses an image of a region of the target 104 that is in line with the camera axis 108 onto the image capturing element 110. The imaged region may contain a plurality of depth levels 114 to the measured. The depth levels to be imaged may be adjacent one another or non-adjacent, depending on the application. In some embodiments, the depth levels may include a continuous slope. The lens assembly 112 may be comprised of any type of known lens assembly having a defined focal length. In one or more embodiments, the lens assembly 112 may be a telecentric lens having a constant and non-angular field of view along the camera axis 108 and whose magnification does not change with respect to a depth along the camera axis 108.

The target 104 may include one or more depth levels 114 to be measured. In some embodiments, the target 104 may include a surface containing a plurality of adjacent, nonadjacent and/or discrete depth levels 114 that are to be accurately measured. Example depth levels to be measured may be in the millimeter or sub-millimeter (e.g., micron) range. For example, in some embodiments, features having depths of a few microns to tens or hundreds of microns may be imaged with the camera and lens assembly 102. Exemplary targets include, but are not limited to, a substrate and mask requiring a uniform separation for film deposition, patterning, semiconductor doping, or other processing, printed circuit boards, flat panel displays, other semiconductor devices, or the like.

Returning to FIG. 1A, in some embodiments, the depth measurement apparatus 100 may include a motor 116 and a lead screw 118 coupled to motion stage 106 which provide for a relative movement between the camera and lens assembly 102 and the target 104. Specifically, rotation of motor 116 causes lead screw 118 to rotate and move motion stage 106 (and camera and lens assembly 102) along camera axis 108 (vertically in FIG. 1A), providing for the relative movement of the camera and lens assembly 102 in defined incremental values along the camera axis 108. The incremental value may be set to any size depending on the step resolution of the motor employed. For example, one or more gears may translate motor step size into larger or smaller incremental values (steps), depending on the application. In some embodiments, the incremental value may be 5, 10, 15 or even 20 microns, although larger or smaller incremental values may be used. In one or more embodiments, the motor 116 may move the camera and lens assembly 102 in incremental values of about fifty (50) micrometers relative to the target 104. The overall distance travelled by the camera and lens assembly 102 may be, in some embodiments, about 20-30 cm, although smaller or larger distances may be used during the step and image capture process described below.

In one or more embodiments, motor 116 may be a linear motor, a DC brushed or brushless motor, an AC motor, a stepper motor or any other suitable motor. A ball screw or other rotary-to-linear transmission may be used in place of lead screw 118 in some embodiments.

The motor 116 in FIG. 1A is shown attached to the camera and lens assembly 102 (via lead screw 118 and motion stage 106), providing for the movement of the camera and lens assembly 102 along the camera axis 108. In general, the motor 116 may be attached directly or indirectly to the camera and lens assembly 102 at any location. For example, the motor 116 may be coupled to a linear stage that supports the camera and lens assembly 102 from a top, bottom or side, such that movement of the linear stage by the motor 116 causes movement of the camera lens assembly 102. Other configurations may be used to support and/or move camera and lens assembly 102.

Figure 1B:
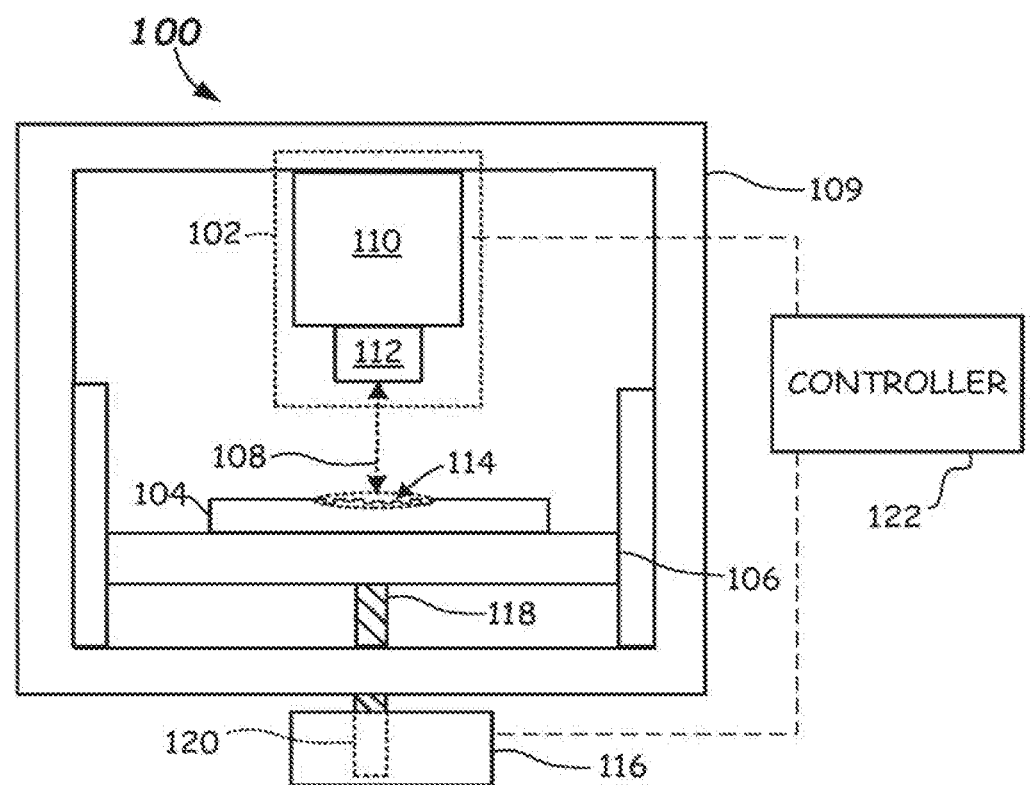
FIG. 1B illustrates a perspective view of an alternate embodiment of the depth measurement apparatus of FIG. 1A using camera focus distance in accordance with embodiments provided herein.

In a variation of the embodiment shown in FIG. 1A, rather than being attached to the camera and lens assembly 102, the motion stage 106 and motor 116 may move the target 104 relative to the camera and lens assembly 102 as shown in FIG. 1B. In this configuration, the target 104 may be moved in defined incremental values along the camera axis 108 relative to the camera and lens assembly 102. In yet another embodiment (not shown), one or more motors may be employed to move both the camera and lens assembly 102 and the target 104 thereby providing for the movement of both the camera and lens assembly 102 and the target 104 in defined incremental values relative to each other.

Returning to FIG. 1A, the depth measurement apparatus 100 includes a position sensor 120 that tracks movement of the camera and lens assembly 102 relative to the target 104. In some embodiments, position sensor 120 may be attached to the camera and lens assembly 102, the motor 116, the motion stage 106, the lead screw 118, or at any other suitable location. Position sensor 120 tracks the position of the camera and lens assembly 102 as it moves with motion stage 106 during a step and image capture process (described below). In the embodiment of FIG. 1B, position sensor 120 may track the position of target 104 as it moves with motion stage 106 during a step and image capture process.

In some embodiments, position sensor 120 may be an optical or other encoder coupled to a shaft of motor 116 or to lead screw 118. Other position sensors may be used. In general, position sensor 120 may be attached to and track the position of the motion stage 106 which is configured to move along the camera axis 108 during a step and image capture process. Other example sensors that may be used include magnetic encoders, linear variable differential transformers (LVDTs), or the like.

In some embodiments, the camera and lens assembly 102 and target 104 may not be vertically aligned. For example, the camera and lens assembly 102 and target 104 may be positioned horizontally. Likewise, the camera axis 108 may not be a straight line. For example, one or more mirrors (not shown) may be employed to direct an image from target 104 to camera and lens assembly 102 at any desired angle (e.g., 45 degrees, 90 degrees, etc.).

A controller 122, such as one or more microprocessors, microcontrollers, dedicated hardware and/or software, or the like, may be provided to control operation of the depth measurement apparatus 100. In some embodiments, the controller 122 may include internal or external memory, and software for controlling operation of the image capturing element 110, lens assembly 112, motor 116, position sensor 120, etc.

Figure 1C:
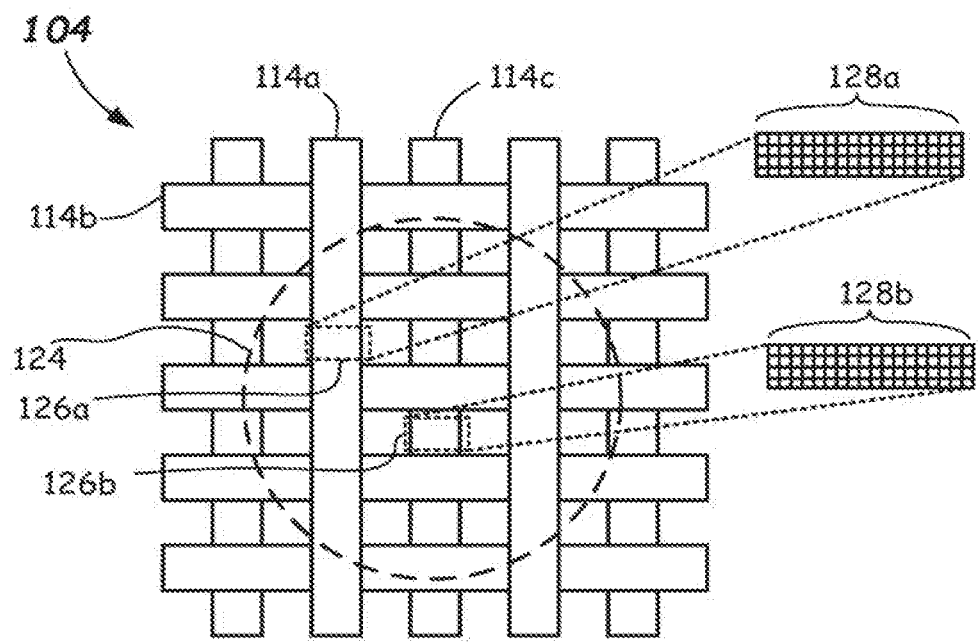
FIG. 1C illustrates an example target having a plurality of depth levels in accordance with embodiments provided herein.

FIG. 1C illustrates an example target 104 having a plurality of depth levels 114a, 114b and 114c in accordance with embodiments provided herein. The target 104 is merely an example, and targets having other features and/or numbers of depth levels may be analyzed using depth measurement apparatus 100. With reference to FIG. 1C, depth levels 114a is at a first elevation, depth level 114b is at a second elevation, and depth level 114c is at a third elevation. Depth level 114a is not adjacent depth level 114c. As will be described further below, depth measurement apparatus 100 may be employed to determine the relative and/or absolute depth of depth levels 114a, 114b and/or 114c. For example, image capturing element 110 may image region 124 in some embodiments. In one particular example embodiment, a region of interest 126a may be analyzed within images taken by image capturing element 110 to determine depth level information for depth level 114a and a region of interest 126b may be analyzed within the images taken by image capturing element 110 to determine depth level information for depth level 114c (as described further below). For example, region of interest 126a of target 104 may correspond to a pixel region 128a of image capturing element 110 and region of interest 126b of target 104 may correspond to a pixel region 128b of image capturing element 110 (shown to the right of target 104 in FIG. 1C).

Figure 2:
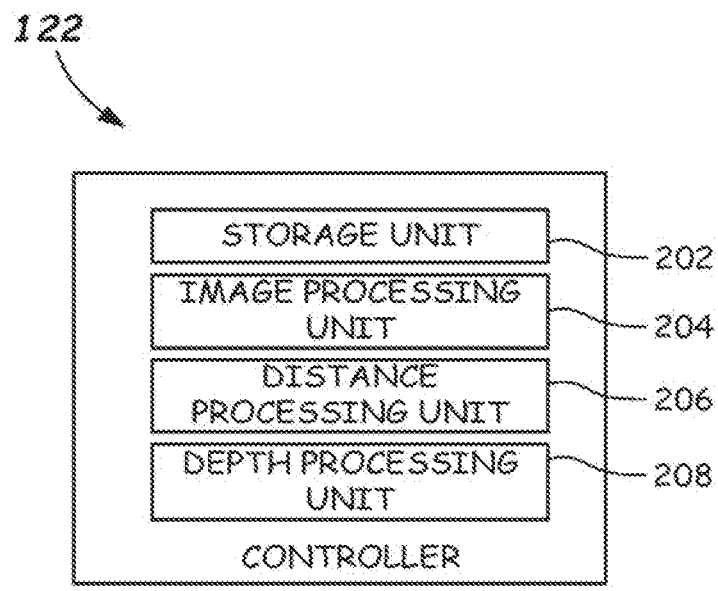
FIG. 2 illustrates a schematic diagram of example processing units provided by a controller for a depth measurement apparatus using camera focus distance in accordance with embodiments provided herein.

FIG. 2 illustrates a schematic diagram of example processing units that may be provided by controller 122 for the depth measurement apparatus 100 using camera focus distance in accordance with embodiments provided herein. The controller 122 may include a storage unit 202, an image processing unit 204, a distance processing unit 206 and a depth processing unit 208. Processing units 204, 206, and/or 208 may be, for example, computer program code or instructions stored in a memory and executable by controller 122. Storage unit 202 may be any suitable storage internal or external to controller 122 (e.g., solid state memory, a hard drive, etc.).

In some embodiments, the storage unit 202 may be configured to store and retrieve a sequence of images captured by the camera and lens assembly 102 as well as corresponding position data for each of the captured images as tracked by position sensor 120 during a step and image capture process. For example, storage unit 202 may maintain the correlation between each captured image and the position of either the camera and lens assembly 102, the target 104, or both depending on which are configured to move along the motion stage 106 using attached motor 116.

The image processing unit 204 is configured to process captured image information, such as by performing a gradient-based edge detection function on each image within a sequence of images captured during a step and image capture process. In one or more embodiments, the gradient-based edge detection method employs the application of an edge detection filter such as a Sobel, Prewitt, Laplace or similar filter to the captured images. The resulting filtered images may have a higher intensity in those portions of the images where distinct edges are detected. Alternatively, the resulting filtered images may have lower or no intensity in those portions of the images where there are no detected edges or where the detected edges are blurry. These processed images along with the original position data for each image may be stored in the storage unit 202, for example. Other edge detection or image gradient methods may be used, including a frequency-domain method such as Discrete Cosine Transform, for example.

In some embodiments, if a target has one or more features within a known depth range, a subset of images may be taken and stored. This may reduce the time to perform measurements for the depth levels. For example, a first image set may include gradient-based edge detection filtered images of a first depth level detected in and extracted from the plurality of originally captured images. A second image set may include gradient-based edge detection filtered images of a second depth level detected in and extracted from the plurality of originally captured images. A third image set may include gradient-based edge detection filtered images of a third depth level detected in and extracted from the plurality of originally captured images, and so on.

In some embodiments, creating and/or storing an image set for each depth level is not performed. For example, all images captured during a step and image capture process may be analyzed for each depth level by reviewing image sharpness information for regions of interest within each image. Referring to the example region of interests 126a and 126b of FIG. 1C, pixel regions 128a and 128b of images captured by image capturing element 110 may be analyzed to determine image sharpness information for depth levels 114a and 114c, respectively.

The application of an image gradient method on the images, and in particular on regions of interest within each image, may be used to produce intensity values corresponding to gradient values for each pixel within each region of interest. This information may be used by the distance processing unit 206 as described below.

The distance processing unit 206 is configured to determine an optimal focus distance between the camera and lens assembly 102 and target 104 for each depth level. For example, the distance processing unit 206 may first perform an aggregating function on the intensity values of each region of interest of each filtered image. Example aggregating functions include mean, standard deviation, maximum or median of intensity values, a combination of one or more of these such as standard deviation divided by mean, or the like, in all or a subset of pixels. A subset of pixels of a region of interest, for example, may be those pixels that have non-zero values within the region of interest of the filtered image. Application of the aggregating function results in an image sharpness scalar value for a region of interest representative of image sharpness for a specific depth level at each incremental position covered within the collected images. Each of these image sharpness scalar values may be stored with its corresponding position data within the storage unit 202, for example.

Once an image sharpness scalar value has been generated for each region of interest of each image included within the collected images, in some embodiments, the distance processing unit 206 may fit a curve to the image sharpness scalar values for each region of interest. For example, a Gaussian, Cauchy or other curve may be used to fit image sharpness scalar values versus position for each region of interest. Based on the curve fit, an optimal focus distance between the camera and lens assembly 102 and the target 104 for each depth level may be determined (e.g., based on the position data associated with a peak image sharpness scalar value for each region of interest). In some embodiments, resolution and accuracy of a depth measurement may be improved by fitting a curve to the image sharpness scalar values prior to a determination of an optimal focus distance. The number of image measurements made for at each depth level also may be reduced.

The depth processing unit 208 may be configured to determine a relative and/or an absolute depth for each of the depth levels for which an optimal focus distance has been determined by the distance processing unit 206.

The position data provided by the sensor 120 provides information regarding the position of the camera and lens assembly 102, the target 104, or both on the motion stage 106 for each image taken. As such, when the optimal focus distances for two different depth levels are determined, a difference between the optimal focus distances provides a relative depth between the depth levels.

The depth processing unit 208 may also determine an absolute measurement for each of the depth levels. In one or more embodiments, an absolute depth measurement may be derived by establishing a known reference depth for a reference surface on the camera and lens assembly 102, the target 104 or some other location, and measuring all other surfaces (e.g., depth levels) on the target 104 relative to the reference surface. That is, the relative distance to the reference surface can be combined with the known surface depth of the reference surface to obtain an absolute measurement. Alternatively, a reference depth may be established using the optimal focal length of the camera and lens assembly 102 as determined prior to its capturing a sequence of the images along the camera axis 108. For example, a reference surface within view of the camera and lens assembly 102 may be imaged and the position of the camera and lens assembly 102 at the optimal focal length of the camera and lens assembly 102 may be determined relative to the reference surface. The position of the camera and lens assembly 102 with respect to the reference surface may be monitored using a position sensor such as an optical encoder. All distance measurements including the known reference surface position, the position of the camera and lens assembly 102 with respect to the reference surface, and the distance of the reference surface from the camera and lens assembly 102 while it is at an optimal focus distance can be combined to produce an absolute depth measurement.

FIGS. 3A-5B are representative data for an example single depth level of a target having a plurality of depth levels. Accordingly, FIGS. 3A-5B are representative of data that would be obtained for each individual depth level of a target having a plurality of depth levels.

Figure 3A:
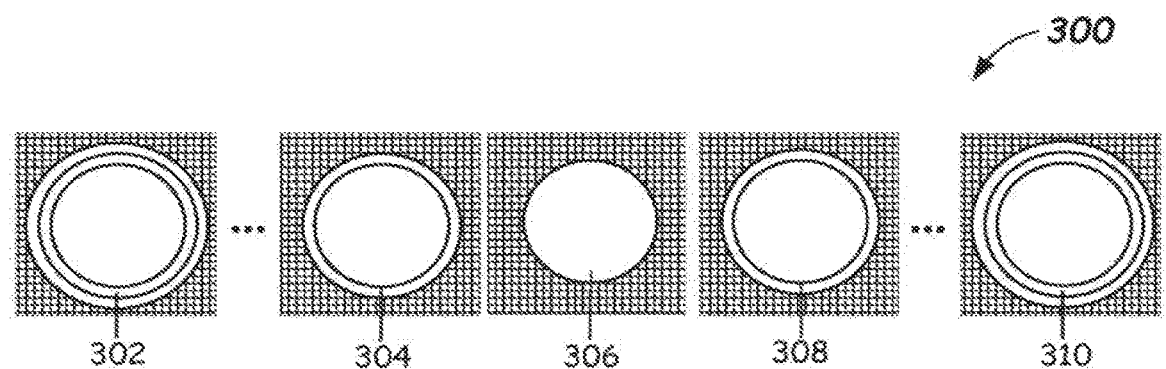
FIG. 3A illustrates a schematic representation of images of a single depth level captured within a sequence of images in accordance with the embodiments herein.

FIG. 3A illustrates a schematic representation 300 of images of a single depth level of a target captured within a sequence of images in accordance with the embodiments herein. In the images of FIG. 3A, images that are blurry have multiple concentric circles while images that are near optimal focus have one circle.

With reference to FIG. 3A, a first image captured by camera and lens assembly 102 is image representation 302. For example, image representation 302 may have been captured as camera and lens assembly 102 began imaging the example depth level. As shown, image representation 302 is blurry (e.g., represented by the multiple concentric circles) as the image was captured at a point far from an optimal focus distance of camera and lens assembly 102. As such, image representation 302 contains little sharpness.

Following the capture of image representation 302, camera and lens assembly 102 was moved and used to capture image representation 304. As shown in FIG. 3A, image representation 304 is less blurry than image representation 302 (as represented by fewer concentric circles) and was captured at a point closer to the optimal focus distance for the depth level.

Following the capture of image representation 304, camera and lens assembly 102 was moved and used to capture image representation 306. Image representation 306 was captured at a position closest to an optimal focus distance along the camera axis 108. This image is the sharpest within the captured sequence of images. As such, this image contains the greatest amount of sharpness detail visible at the edges of the depth level (no concentric circles representing sharp edges in the captured image).

Following the capture of image representation 306, camera and lens assembly 102 was moved and used to capture image representation 308, then moved and used to capture image representation 310. Image representations 308 and 310 were captured when camera and lens assembly 102 was further from the optimal focus distance from the depth level and are therefore blurry (being similar to image representations 304 and 302, respectively, for example).

Figure 3B:
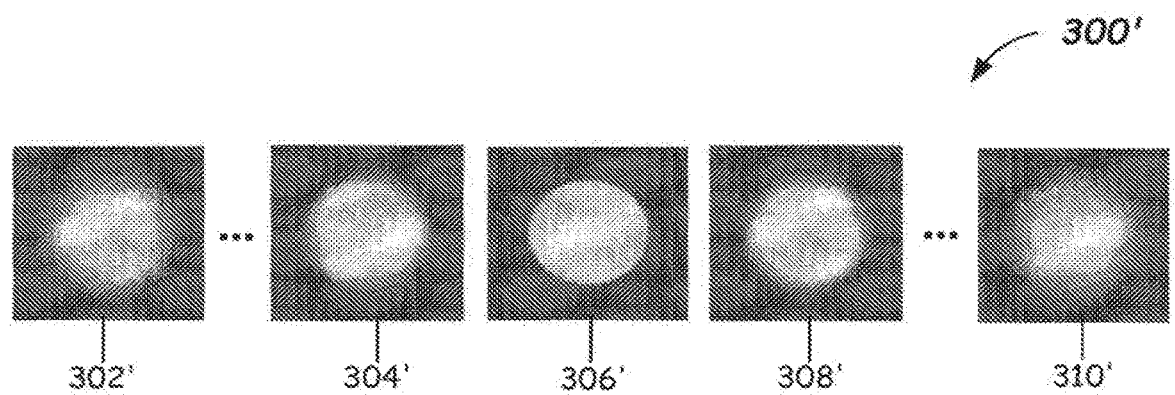
FIG. 3B illustrates images of a single depth level represented within a captured sequence of images in accordance with the embodiments herein.

FIG. 3B illustrates actual images 300' of a single depth level of a target represented within a captured sequence of images, corresponding to the image representations of FIG. 3B, in accordance with the embodiments herein. With reference to FIG. 3B, the blurriest images (represented by reference numerals 302' and 310') were captured at points farthest from an optimal focus distance between the camera and lens assembly 102 and the depth level being imaged. As such, these captured images contain the least amount of sharpness detail visible at the edges of the depth level. As the camera and lens assembly 102 is moved relative to the depth level being imaged, the captured images become less blurry (reference numerals 304' and 308') as the camera and lens assembly 102 come closer to the optimal focus distance from the depth level as represented by reference numeral 306'.

Figure 4A:
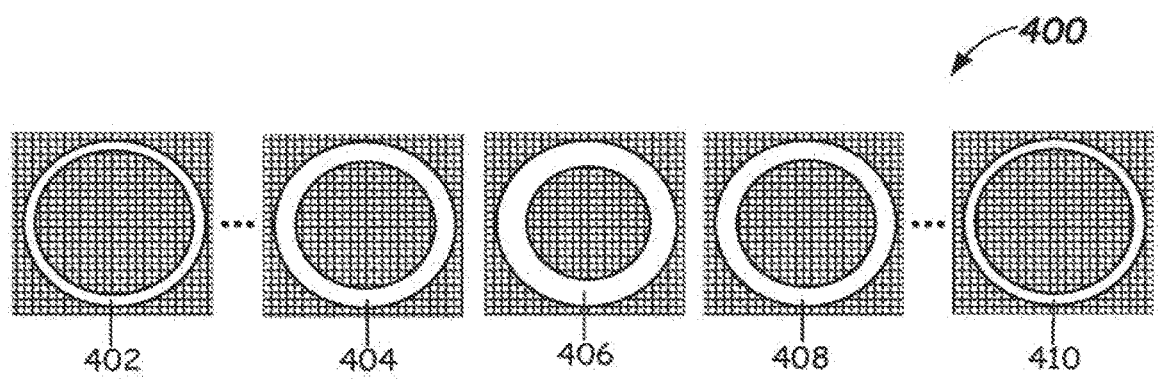
FIG. 4A illustrates a representation of a single depth level within a captured sequence of images to which an image gradient filter has been applied in accordance with the embodiments herein.

FIG. 4A illustrates a representation 400 of a single depth level within a captured sequence of images to which an image gradient filter, such as a Sobel filter, has been applied in accordance with the embodiments herein. Specifically, representation 400 provides filtered image representations corresponding to the image representations 302-310 of FIG. 3A. The filtered image representations 402 and 410 have the lowest intensity gradient values of the filtered images as they are derived from the blurriest image representations 302 and 310. The low intensity gradient value of the image representations 402 and 410 is representative of the lack of sharpness detail visible at the edges of the depth level in the captured image representations 302 and 310 (with the small white area representing low intensity gradient value in the filtered image).

Similarly, the filtered image representations 404 and 408 have a low intensity gradient value as they are also derived from blurry image representations 304 and 308 within the captured sequence of image representations of FIG. 3A. The low intensity gradient value of the filtered image representations 404 and 408 is a result of the lack of sharpness detail visible at the edges of the depth level in the captured image representations 304 and 308 (with the small white area representing low intensity gradient value in the filtered image).

The filtered image representation 406 has the greatest intensity gradient values as it is derived from the sharpest image representation 306 within the captured sequence of images. The high intensity gradient value of the filtered image representations 406 is representative of sharpness detail visible at the edges of the depth level in the captured image representation 306 (with greatest white area representing greatest intensity gradient value in the filtered image).

Figure 4B:
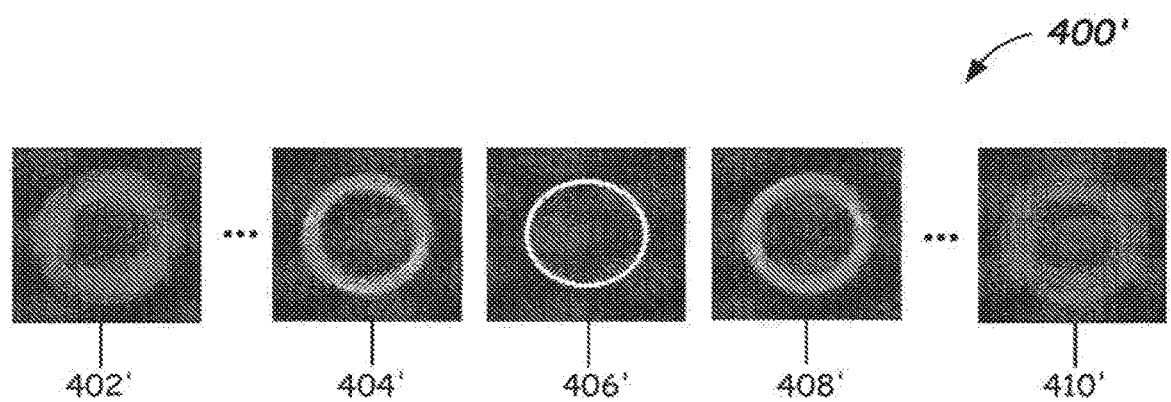
FIG. 4B illustrates filtered images of a single depth level within a captured sequence of images to which an image gradient filter has been applied in accordance with the embodiments herein.

FIG. 4B illustrates actual filtered images of a single depth level within a captured sequence of images, corresponding to the image representations of FIG. 4A, to which an image gradient filter has been applied in accordance with the embodiments herein. Image sharpness data is obtained by applying an image gradient filter to the sequence of images of FIG. 3B. The filtered images 402' and 410' have the lowest image sharpness as they are derived from the blurriest images.

Images closer to the optimal focus distance are less blurry and have more pronounced filtered images (see reference numerals 404' and 408'). The image taken when camera and lens assembly 102 was closest to the optimal focus distance to the depth level has the brightest image gradient (reference numeral 406').

As mentioned, one or more regions of interest may be analyzed within images taken by image capturing element 110 to determine depth level information for one or more depth levels. For example, a region of interest of a target may correspond to a pixel region of image capturing element 110. In some embodiments, an aggregation function may be applied to each region of interest. For example, the intensity values determined for each pixel (or a subset of pixels) within a region of interest may be employed to calculate a mean intensity value, a standard deviation, a maximum or median intensity value, a combination of the above such as standard deviation divided by mean, or the like, for that region of interest. In some embodiments, the aggregation function may be used to generate image sharpness information, such as an image sharpness scalar value for each region of interest within each image.

Figure 5A:
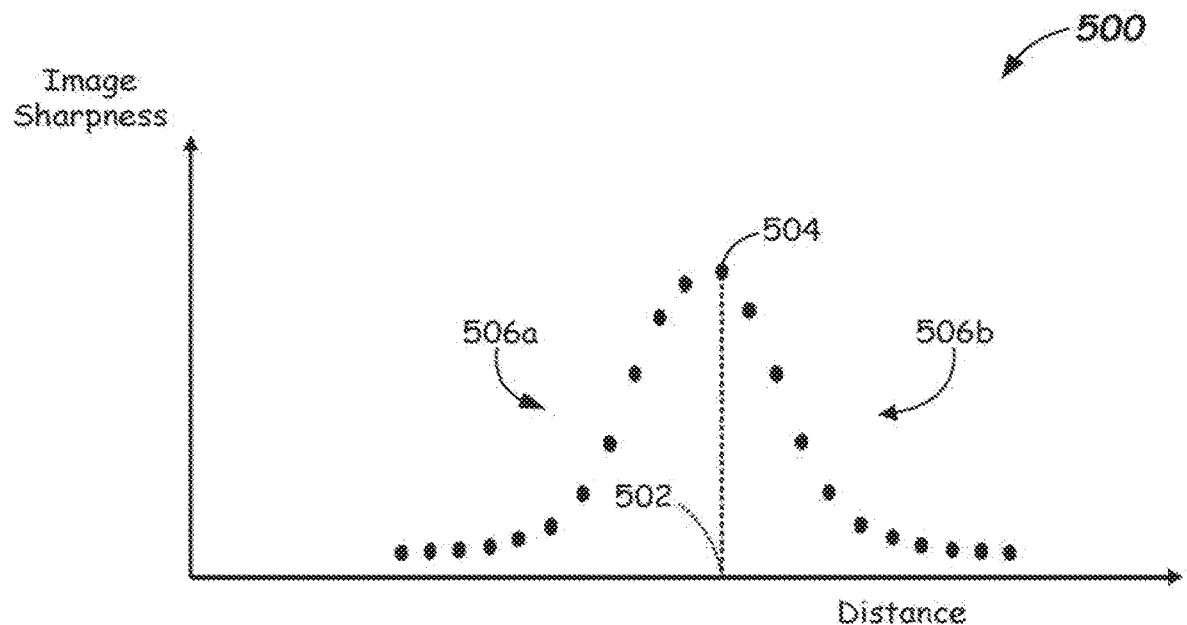
FIG. 5A illustrates a plot of distance versus image sharpness scalar values representative of a single depth level included within a captured sequence of images in accordance with the embodiments herein.

FIG. 5A illustrates a plot 500 of camera position (distance) versus image sharpness (scalar values) representative of a single depth level included within a captured sequence of images in accordance with the embodiments herein. FIG. 5A illustrates image sharpness data for 22 captured images. In some embodiments, fewer or more images may be captured. Additionally, in some embodiments, more images may be captured near where an optimal focus is expected for a particular depth level (if such information is available). For example, the frequency at which images are taken may be increased or decreased based on camera position relative to a depth level.

As shown in the plot of FIG. 5A, the camera distance 502 is the distance that correlates to the highest image sharpness scalar value 504 (e.g., approximate optimal focus distance for the depth level). Lesser image sharpness scalar values 506a and 506b are shown on each side of the highest image sharpness scalar value 504 at corresponding distances that are less and more than the distance 502 that produces the highest image sharpness scalar value 504. These distances are separated by the incremental value used by the motor 116 to step the camera and lens assembly 102 up to and then past the distance 502 that produces the highest image sharpness scalar value 504 (e.g., the approximate optimal focus distance of the depth level).

Figure 5B:
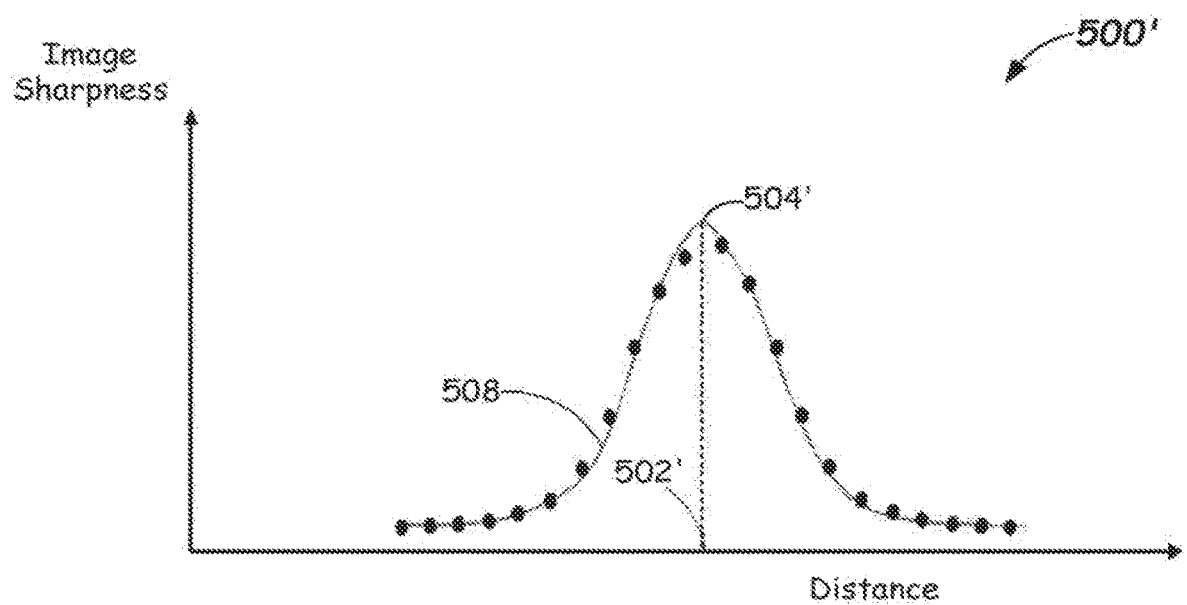
FIG. 5B illustrates a plot of distance versus scalar image sharpness values representative of a single depth level to which a curve has been fitted in accordance with the embodiments herein.

FIG. 5B illustrates a plot 500' of camera position (distance) versus image sharpness scalar values representative of a single depth level to which a curve 508 has been fitted in accordance with the embodiments herein. Curve 508 is fitted to the plotted image sharpness scalar values shown in FIG. 5A. Once fitted, the curve 508 may be used to provide a different distance 502' that produces the highest image sharpness scalar value (e.g., image sharpness scalar value 504' in FIG. 5B). As mentioned, the image capturing element 110 may not capture an image at the exact optimal focal distance for a particular depth level. By fitting a curve to the image sharpness data, a more accurate prediction of the actual optimal focal distance may be obtained (as shown in FIG. 5B). As such, the use of curve fitting may increase the resolution and/or accuracy of depth measurements.

Figure 6:
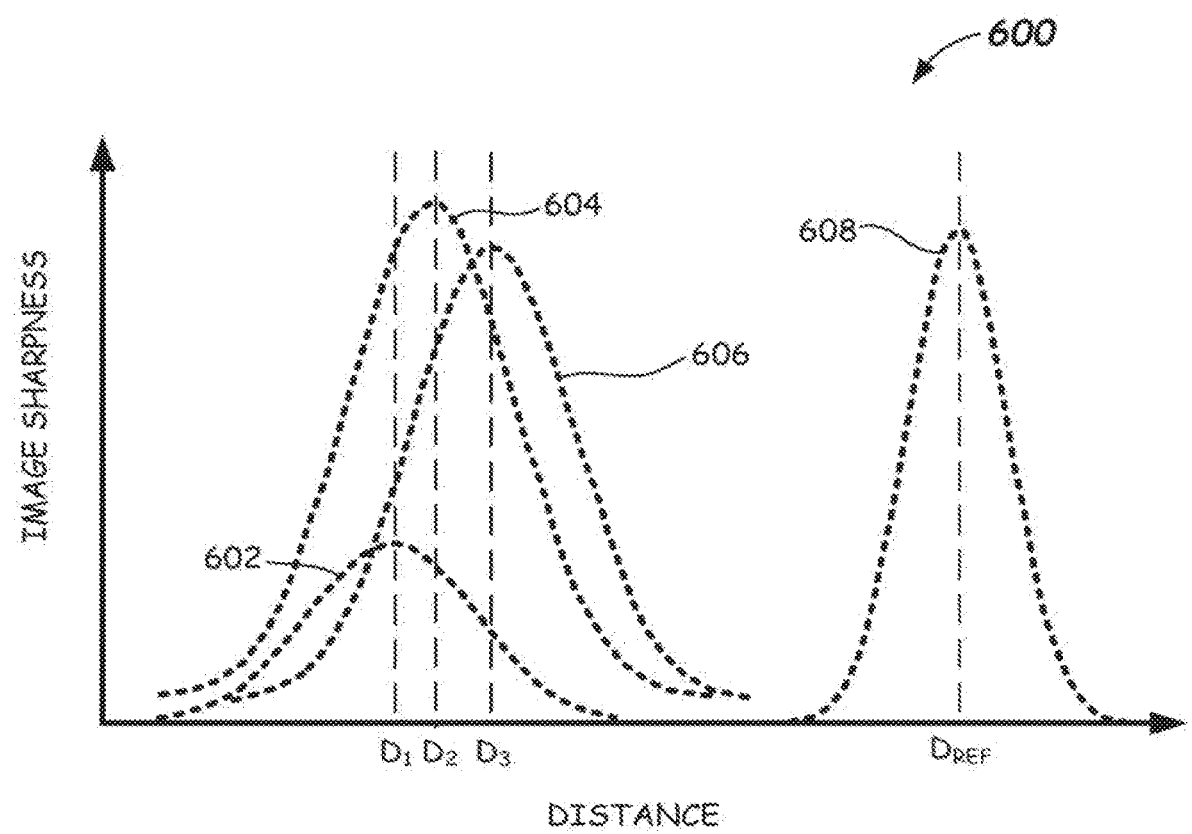
FIG. 6 illustrates an example plot of image sharpness versus distance for a plurality of depth levels in accordance with embodiments herein.

FIG. 6 illustrates an example plot 600 of image sharpness versus distance for a plurality of depth levels in accordance with embodiments herein. With reference to FIG. 6, first curve 602 represents the curve fit of image sharpness scalar values for a first depth level, second curve 604 represents the curve fit of image sharpness scalar values for a second depth level, and third curve 606 represents the curve fit of image sharpness scalar values for a third depth level of a target. Fourth curve 608 represents the curve fit of image sharpness scalar values for a reference feature (e.g., present on or near the target or camera assembly, for example). The image sharpness data of plot 600 shows that the image capturing element 110 is near optimal focus for the first depth level at a distance $D_1$, for the second depth level at a distance $D_2$ and for the third depth level at a distance $D_3$. Comparing the distances $D_1$, $D_2$ and/or $D_3$ to one another may provide relative distance and/or depth information for the depth levels, whereas comparing distances $D_1$, $D_2$ and/or $D_3$ to distance $D_{REF}$ of the reference depth level may provide for absolute measurements of the distance and/or depth of each depth level.

Figure 7:
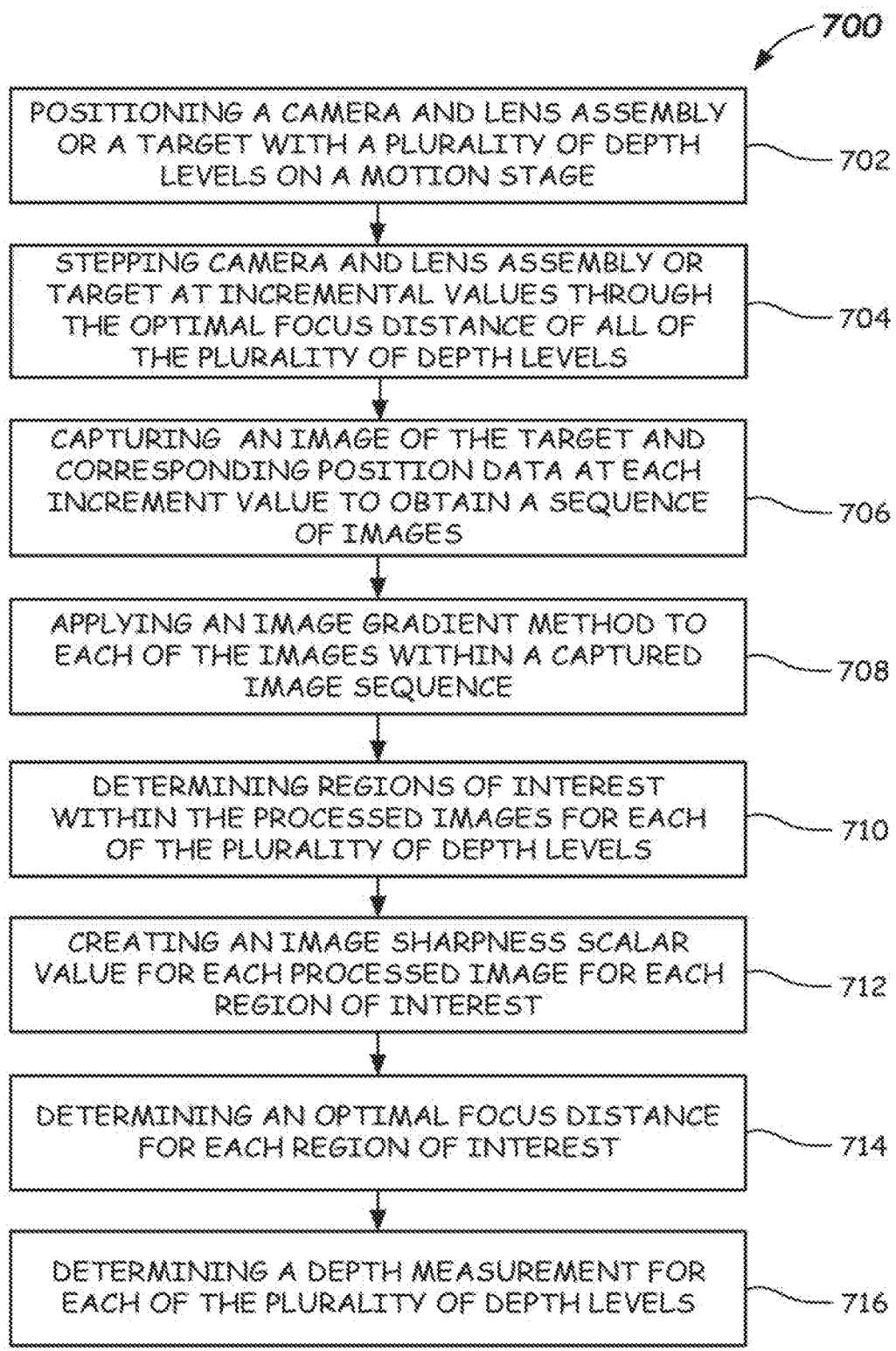
FIG. 7 illustrates a flowchart depicting a method of obtaining depth measurements using camera focus distance in accordance with embodiments provided herein.

FIG. 7 illustrates a flowchart depicting a method 700 of obtaining depth measurements using camera and lens assembly focus distance in accordance with embodiments provided herein. The method 700 begins in Block 702 with positioning a camera and lens assembly or the target on a motion stage such that the camera and lens assembly or the target is moveable. For example, a camera and lens assembly 102 or a target 104 with a plurality of depth levels may be positioned on a motion stage 106. The camera and lens assembly 102 and the target 104 may each be positioned such that the camera and lens assembly 102, the target 104, or both are moveable on the motion stage 106. This motion stage allows relative distance between the camera and lens assembly 102 and the target 104 to be changed, beginning at a position that is either greater than or less than an optimal focus distance for any of the plurality of depth levels to be measured.

Once positioned, the method 700 includes at Block 704 stepping the camera and lens assembly or the target forward or backwards at defined incremental values through an optimal focus distance for all of the plurality of the depth levels of the target. For example, the camera and lens assembly 102 or (the target 104) may be stepped forward or backwards at defined incremental values. This stepping continues until the relative distance either increases or decreases through an optimal focus distance for all the plurality of depth levels to be measured.

While the relative distance is either increasing or decreasing, in Block 706, at each incremental value, method 700 includes employing a sensor to measure position data of the camera and lens assembly or the target, and employing the camera and lens assembly to capture an image of the target so as to capture a sequence of images. In some embodiments, the captured image and corresponding position data of the motion stage for each incremental value may be stored. For example, at each incremental value, an image may be captured and stored of the target 104 using the camera and lens assembly 102 as well as corresponding position data of the motion stage provided by position sensor 120.

Once an image sequence and corresponding position data have been captured, at Block 708, method 700 includes applying an image gradient method to each of the images within the captured sequence of images. The image gradient method may be used to create processed images with higher intensity gradient values where a greater amount of sharpness detail is visible at edges of a depth level and lower intensity gradient values where a lesser amount of sharpness detail is visible at edges of a depth level in each of the captured images. Once processed, in some embodiments, the processed images may be stored. As mentioned, a Sobel or similar filter may be applied to each image to enhance edge features.

Once the gradient-filtered images are created, in Block 710, method 700 includes determining regions of interest within the processed images for each of the plurality of depth levels, each region of interest comprising a subsection of the processed images corresponding to an individual region of the target. In some embodiments, regions of interest within captured images may be a predetermined subset of pixels within each image. For example, a user may manually define regions of interest that will be used at each depth level (e.g., by selecting a subset of pixels within each image that correspond to each depth level). In some embodiments, target (fiducial) finding algorithms may be employed to determine the positions of points of interest within captured images, and then predefined regions around the points of interest may be used as regions of interest (e.g., ball-, donut-, rectangle-, square- or otherwise-shaped regions around points of interest). For background and foreground objects, Boolean mask operations may be applied to define the extent of each object and to preferentially include or exclude these regions within regions of interest.

In some embodiments, detected edges may be used to segment each image into regions of interest. For example, a template finding algorithm may be employed to find the center of two circular or otherwise-shaped fiducials. Regions of interest may be defined as the regions around the edges of the fiducials. In one example embodiment, a foreground ball-shaped region may be subtracted from a background donut-shaped region to obtain the background region of interest. A foreground region of interest may be a donut region around a foreground center position. Other suitable methods for defining regions of interest may be employed.

After regions of interest for each depth level are determined, in Block 712, the method 700 includes creating an image sharpness scalar value for each processed (filtered) image for each region of interest. For example, an aggregating function may be applied to one or more intensity gradient values within each region of interest to determine the image sharpness scalar values.

In Block 714, the method 700 includes determining an optimal focus distance based on the image sharpness scalar value for each region of interest. In some embodiments, this may include fitting a curve to image sharpness scalar value versus distance data as previously described. The optimal focus distance may be derived from the position data associated with a highest image sharpness scalar value within each region of interest, for example.

In Block 716, the method 700 includes determining a relative (and/or absolute) depth measurement for each of the plurality of depth levels based on the determined optimal focus distance for each of the regions of interest.

The foregoing description discloses only example embodiments. Modifications of the above-described apparatus and methods which fall within the scope of this disclosure will be readily apparent to those of ordinary skill in the art. Accordingly, while the present invention has been disclosed in connection with example embodiments thereof, it should be understood that other embodiments may fall within the spirit and scope of the invention, as defined by the following claims.

What is claimed is:

1. A depth measuring apparatus comprising:
   a camera assembly configured to capture a plurality of images of a target at a plurality of distances from the target;
   a position sensor configured to capture, for each of the plurality of images, corresponding position data associated with a relative distance between the camera assembly and the target; and
   a controller configured to, for each of a plurality of regions within the plurality of images:
      determine corresponding gradient values within the plurality of images;
      determine a corresponding maximum gradient value from the corresponding gradient values; and
      determine a depth measurement for a region of the plurality of regions based on the corresponding maximum gradient value and the corresponding position data captured for an image from the plurality of images that includes the corresponding maximum gradient value.

2. A depth measuring apparatus comprising:
   a camera assembly configured to capture a plurality of images of a target at a plurality of distances from the target;
   a position sensor configured to capture, for each of the plurality of images, corresponding position data associated with a relative distance between the camera assembly and the target; and
   a controller configured to:
      determine a corresponding gradient value for each of a plurality of regions within each of the plurality of images;
      determine, based on the corresponding gradient value for each of the plurality regions, a corresponding maximum gradient value for each of the plurality of regions; and
      determine, based on the corresponding maximum gradient value for each of the plurality of regions and the corresponding position data for each of the plurality of images, a depth measurement for each of the plurality of regions.

3. The depth measuring apparatus of claim 2, wherein the plurality of images of the target are to be captured by the camera assembly at the plurality of distances from the target by moving at least one of the camera assembly or the target.

4. The depth measuring apparatus of claim 2, wherein the controller is to determine the corresponding gradient value by applying an image gradient filter to the plurality of images.

5. The depth measuring apparatus of claim 4, wherein the image gradient filter comprises one or more of an edge detection filter, a Sobel filter, a Prewitt filter, or a Laplace filter.

6. The depth measuring apparatus of claim 2, wherein the controller is further to determine the depth measurement based on a reference depth, wherein the plurality of regions are measured relative to the reference depth.

7. The depth measuring apparatus of claim 2, wherein the camera assembly and the target are:
vertically aligned;
horizontally aligned; or
aligned along an angle.

8. The depth measuring apparatus of claim 2, wherein the controller is to determine a plurality of depth measurements comprising the depth measurement, wherein the plurality of depth measurements are associated with a plurality of adjacent depth levels and a plurality of non-adjacent depth levels.

9. A depth measuring apparatus comprising:
a camera assembly configured to capture a plurality of images of a target at a plurality of distances from the target;
a position sensor configured to capture, for each of the plurality of images, corresponding position data associated with a relative distance between the camera assembly and the target; and
a controller configured to process the plurality of images and the corresponding position data for each of the plurality of images using an image gradient filter to determine a depth measurement for each of a plurality of regions within the plurality of images.

10. The depth measuring apparatus of claim 9, wherein the plurality of images of the target are to be captured by the camera assembly at the plurality of distances from the target by moving at least one of the camera assembly or the target.

11. The depth measuring apparatus of claim 9, wherein the controller is to determine a corresponding gradient value for each of the plurality of regions within the plurality of images by applying the image gradient filter to the plurality of images, wherein the controller is to determine a corresponding maximum gradient value for each of the plurality of regions based on the corresponding gradient value for each of the plurality of regions, and wherein the depth measurement is determined based on the corresponding maximum gradient value for each of the plurality of regions.

12. The depth measuring apparatus of claim 11, wherein the image gradient filter comprises one or more of an edge detection filter, a Sobel filter, a Prewitt filter, or a Laplace filter.

13. The depth measuring apparatus of claim 9, wherein the controller is further to determine the depth measurement based on a reference depth, wherein the plurality of regions are measured relative to the reference depth.

14. The depth measuring apparatus of claim 9, wherein the camera assembly and the target are:
vertically aligned;
horizontally aligned; or
aligned along an angle.

15. The depth measuring apparatus of claim 9, wherein the controller is to determine a plurality of depth measurements comprising the depth measurement, wherein the plurality of depth measurements is associated with a plurality of adjacent depth levels and a plurality of non-adjacent depth levels.

16. A method comprising:
receiving a plurality of images of a target captured by a camera assembly at a plurality of distances from the target;
receiving, for each of the plurality of images, corresponding position data associated with a relative distance between the camera assembly and the target;
determining a corresponding gradient value for each of a plurality of regions within the plurality of images;
determining, based on the corresponding gradient value for each of the plurality of regions, a corresponding maximum gradient value for each of the plurality of regions; and
determining, based on the corresponding maximum gradient value for each of the plurality of regions and the corresponding position data for each of the plurality of images, a depth measurement for each of the plurality of regions.

17. The method of claim 16, wherein the plurality of images of the target are to be captured by the camera assembly at the plurality of distances from the target by moving at least one of the camera assembly or the target.

18. The method of claim 16, wherein the determining of the corresponding gradient value is by applying an image gradient filter to the plurality of images.

19. The method of claim 16, wherein the determining of the depth measurement is further based on a reference depth, wherein the plurality of regions are measured relative to the reference depth.

20. The method of claim 16 further comprising:
determining a plurality of depth measurements comprising the depth measurement, wherein the plurality of depth measurements is associated with a plurality of adjacent depth levels and a plurality of non-adjacent depth levels.

* * * * *